United States Patent [19]

Marrion et al.

[11] Patent Number: 5,218,055
[45] Date of Patent: Jun. 8, 1993

[54] COATING COMPOSITIONS AND POLYANHYDRIDES FOR USE THEREIN

[75] Inventors: Alastair R. Marrion, Northumberland; Alistair A. Finnie, Tyne and Wear, both of United Kingdom

[73] Assignee: Courtaulds Coatings (Holdings) Limited, United Kingdom

[21] Appl. No.: 866,085

[22] Filed: Apr. 3, 1992

Related U.S. Application Data

[63] Continuation of Ser. No. 634,198, Jan. 18, 1991, abandoned.

[30] Foreign Application Priority Data

Jul. 18, 1988 [GB] United Kingdom ............... 8817085

[51] Int. Cl.$^5$ ............................................. C08F 8/32
[52] U.S. Cl. ............................. 525/327.6; 525/183; 525/207; 525/327.4; 525/382; 525/384
[58] Field of Search ............... 525/327.4, 382, 207, 525/327.6

[56] References Cited

U.S. PATENT DOCUMENTS

| | | | |
|---|---|---|---|
| 3,329,658 | 7/1967 | Fields | 260/78.5 |
| 3,449,250 | 6/1964 | Fields | 252/51.5 |
| 3,529,993 | 9/1970 | Cummings | 117/105.5 |
| 3,984,382 | 10/1976 | Parekh et al. | 526/15 |
| 4,452,948 | 6/1984 | Marrion | 525/207 |
| 4,596,863 | 6/1986 | Sackmann | 526/262 |
| 4,634,736 | 1/1987 | Ooka | 525/117 |
| 4,670,516 | 6/1987 | Sackmann | 525/327.6 |
| 4,670,521 | 6/1987 | Ooka | 525/382 |

FOREIGN PATENT DOCUMENTS 0134691 3/1985 European Pat. Off. .
0156210 10/1985 European Pat. Off. .
0254172 3/1988 European Pat. Off. .

OTHER PUBLICATIONS

International search report, mailed Dec. 6, 1989.

Primary Examiner—Joseph L. Schofer
Assistant Examiner—Fred Zitomer
Attorney, Agent, or Firm—Eckert Seamans Cherin & Mellott

[57] ABSTRACT

A novel polyanhydride having at least two cyclic carboxylic acid anhydride groups per molecule also contains pendent amine groups, the proportion of amine groups to cyclic carboxylic acid anhydride groups being no more than 4:1 and the content of free carboxylic acid groups, if any are present, being less than 200 mole percent based on the amine groups, A coating composition comprises (A) a hydroxy component having at least two free hydroxy groups per molecule and (B) an anhydride component having at least two cyclic carboxylic acid anhydride groups per molecule, at least one of (A) and (B) being a film-forming polymer. The anhydride component (B) contains a catalytically effective amount of pendent amine groups for accelerating the curing reaction between the hydroxy groups of (A) and the anhydride groups of (B) and is preferably one of the novel polyanhydrides.

18 Claims, No Drawings

COATING COMPOSITIONS AND POLYANHYDRIDES FOR USE THEREIN

This is a continuation of application Ser. No. 634,198, filed Jan. 18, 1991 now abandoned.

TECHNICAL FIELD

This invention relates to coating compositions and to their production; also to novel polyanhydrides for use therein.

BACKGROUND ART

U.S. Pat. No. 4,452,948 describes a two-pack coating composition comprising a hydroxy component and an anhydride component, in which the hydroxy component is a polymer having at least two free hydroxy groups per molecule and also has in its molecule amine groups for accelerating the curing reaction between the hydroxy groups and the anhydride groups, and the anhydride component is a polymer having at least two cyclic carboxylic acid anhydride groups per molecule. In a less preferred modification the amine groups are present in a separate amine compound rather than on the molecule of the hydroxy component. The coatings of U.S. Pat. No. 4,452,948 have the advantage that they are ambient-temperature-curing without the use of toxic isocyanates and have been successfully as finish coats for automobiles, particularly in re-finishing, and as paints for yachts.

European Patent Application 134691 describes a three-component coating composition comprising a compound having at least two hydroxy groups, a compound having at least two anhydride groups and a compound having at least two epoxide groups.

European Patent Application 259172 describes a coating composition comprising an anhydride polymer and a polymer containing hydroxyalkylamino, hydroxyalkoxyalkylamino, hydroxy-substituted acyloxyalkylamino, hydroxy-substituted polyacyloxyalkylamino, mercaptoalkylamino or oxazolidino groups. One of the polymers comprises a flexible polymer chain and has its functional groups present as terminal groups at the end of the flexible polymer chain.

U.S. Pat. No. 3,984,382 describes a modified cationic vinyl polymer suitable for electrocoating and prepared by reacting a copolymer of maleic anhydride, styrene and an alkyl acrylate with an amino alcohol and/or a difunctional amine until the modified polymer has no residual anhydride rings, and reacting the product with a monoepoxy compound.

U.S. Pat. Nos. 3,449,250 and 3,329,658 describe an additive which imparts stability and detergency to mineral oil. The additive comprises a copolymer of maleic anhydride and an alpha-olefin which has been partially esterified with an aliphatic alcohol to make the copolymer oil-soluble and in which substantilay all of the remainder of the carboxy groups are imidized.

German Patent 1594333 describes water-soluble polyelectrolytes useful as flocculating agents and retention aids in paper-making and made by reacting a copolymer of an ethylenically unsaturated carboxylic anhydride with a polyamine containing only one primary or secondary amino group, and reacting the reaction product with an epihalohydrin and/or a diepoxide.

DISCLOSURE OF THE INVENTION

A coating composition according to the invention comprising (A) a hydroxy component having at least two free hydroxy groups per molecule and (B) an anhydride component having at least two cyclic carboxylic acid anhydride groups per molecule, at least one of (A) and (B) being a film-forming polymer, said composition containing a catalytically effective amount of amine groups for accelerating the curing reaction between the hydroxy groups of (A) and the anhydride groups of (B), is characterised in that the anhydride component (B) contains the said amine groups as pendent groups in its molecules.

A polyanhydride according to the invention, having at least two cyclic carboxylic acid anhydride groups per molecule, is characterised in that the polyanhydride contains pendent amine groups, the proportion of amine groups to cyclic carboxylic acid anhydride groups being no more than 4:1 and the content of free carboxylic acid groups, if any are present, being less than 200 mole percent based on the amine groups.

The proportion of amine groups to cyclic carboxylic acid anhydride groups in the polyanhydride is preferably at least 0.01:1 and no more than 1.5:1, most preferably 0.01:1 to 1:1. The content of the free carboxylic acid groups is preferably less than 100 mole percent based on the amine groups; most preferably, free carboxylic acid groups are substantially absent or are present at less than 20 mole percent based on amine groups.

The coating compositions of the invention have advantages over those described in U.S. Pat. No. 4,452,948 and European Patent Application 259172. The polyanhydrides of the invention can be used in coating compositions with a wide variety of hydroxyfunctional polymers, including unmodified commercial polymers. The coating compositions also have improved stability against photo-degradation compared to many of the coatings of European Patent Application 259172. The coating compositions of the invention avoid the possibilities of environmental hazard and stickiness of the cured coating, which may be encountered using a free amine compound as catalyst.

The amine groups present in the polyannydride are preferably tertiary amine groups, which are the most effective in catalysing the reaction between the hydroxy and the anhydride groups without giving rise to side reactions.

One preferred type of polyanhydride according to the invention is a polymer containing cyclic carboxylic acid anhydride groups and N-(dialkylaminoalkyl)-substituted imide groups. Such a polyanhydride can be formed by the reaction of a polymer containing cyclic carboxylic acid anhydride groups with a less than stoichiometric amount of a polyamine containing a primary amine group and at least one tertiary amine group. The said polymer containing cyclic carboxylic acid anhydride groups is preferably derived from an olefinically unsaturated cyclic carboxylic acid anhydride.

The polymer containing cyclic carboxylic acid anhydride groups can for example be a copolymer of an olefinically unsaturated cyclic carboxylic acid anhydride such as maleic, itaconic, citraconic or vinylsuccinic anhydride or vinyl trimellitate anhydride with one or more olefinically unsaturated comonomers such as an alphaolefin, for example ethylene or propylene, a vinyl comonomer, for example styrene or a substituted styrene, vinyl acetate or vinyl chloride, or an ester of acrylic of methacrylic acid, for example butyl acrylate, ethyl acrylate, methyl methacrylate or butyl methacrylate. Preferred copolymers contain 10–40 percent, most preferably 20–35 percent, by weight maleic or itaconic anhydride groups and have a molecular weight of 1500–30000, e.g. 4000–12000. If the coating is to be used as a decorative top coat it may be preferred to use a vinyl comonomer at a molar ratio of at least 1:1 with respect to the anhydride monomer, as described in U.S. Pat. No. 4,798,745.

The polymer containing cyclic carboxylic acid anhydride groups can alternatively be an adduct of an unsaturated cyclic carboxylic acid anhydride and a diene polymer, such as maleinised polybutadiene or a maleinised copolymer of butadiene, for example a butadiene/styrene copolymer. The maleinised diene polymer is preferably hydrogenated to remove residual unsaturation. Terpene/maleic anhydride copolymer resins are a further alternative. An anhydride adduct of an unsaturated fatty acid ester, for example, a styrene/allyl alcohol copolymer esterified with an unsatruated fatty acid and maleinised, can also be used. The polymer containing cyclic carboxylic acid anhydride groups can alternatively be formed by the reaction of a polymer containing thiol groups with an olefinically unsaturated cyclic carboxylic acid anhydride such as maleic anhydride or itaconic anhydride. The polymer containing thiol groups is preferably thiol-tipped; it can for example be a multi-limbed telechelic polymer formed by reaction of a corresponding hydroxy-tipped polymer with mercaptoacetic acid.

Alternative anhydride-containing polymers can be formed from hydroxy-containing polymers, for example copolymers of hydroxyethyl acrylate or hydroxyethyl methacrylate or styrene/allyl alcohol copolymers, by reaction with a tricarboxylic compound capable of introducing anhydride groups, for example as described in European Patent Application 259172. A further alternative type of polymer containing anhydride groups is an adduct of trimellitic anhydride and a polyol, as described in European Patent Application 134691.

The polyamine which is reacted with the polymer containing anhydride groups is preferably a primary/tertiary diamine, for example N,N-dimethylpropane-1,3-diamine ((CH$_3$)$_2$NCH$_2$CH$_2$CH$_2$NH$_2$), N,N-dimethylethylenediamine, 4-amino-1-(diethylamino)-pentane, N,N-diethylpropane-1,3-diamine, 2-amino-pyridine, 3-amino-pyridine, 4-amino-pyridine or N-(3-aminopropyl)-morpholine. The primary amine group reacts with the anhydride group to form an imide group which has the tertiary amine group in a pendent organic group attached to the imide nitrogen atom. The substituted imide groups formed generally have the formula

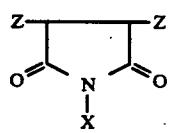

wherein each Z represents a polymer residue and X is an organic group containing a tertiary amine group and is attached to the imide nitrogen atom by a carbon-nitrogen bond. The group X can for example be an aminoalkyl group of the form —A—NR$_2$, where —A— is a straight or branched-chain alkylene group preferably having 2 to 8 carbon atoms and each group R is an alkyl group preferably having 1 to 4 carbon atoms; a heterocyclic ring containing a tertiary nitrogen atom such as 4-pyridyl; or an alkyl group substituted by a heterocyclic ring containing a tertiary nitrogen atom such as a pyridine or morpholine ring. For example, using N,N-dimethylpropane-1,3-diamine

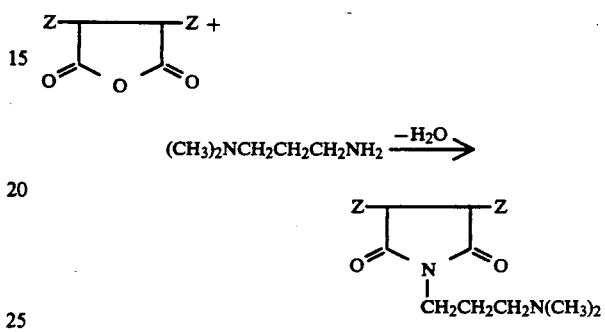

where each Z represents a polymer residue.

The reaction between the polymer containing anhydride groups and the diamine can for example be carried out by heating under reflux in an organic solvent which has a boiling point substantially higher than that of water (for example 120°–180° C.) or forms an azeotrope with water, with water being removed by distillation during the reaction. Examples of solvents are esters such as butyl acetate or methoxypropyl acetate, ketones such as methyl isobutyl ketone or aromatic hydrocarbons such as xylene. The anhydride and amine initially react to form an acid amide which may have limited solubility, particularly in hydrocarbon solvents. It may be preferred to add the diamine gradually during the reaction. Alternatively, the reaction can be carried out as a 2-stage reaction in which the acid amide is formed in an initial step and is heated in a solvent, with removal of water, or with a dehydrating agent such as acetic anhydride or a carbodiimide such as dicyclohexyl carbodiimide.

The proportion of polyamine reacted with the polymer containing anhydride groups is generally no more than 0.8 mole of polyamine per mole of anhydride groups in the polymer and is preferably no more than 0.5 mole/mole so that the resulting polyanhydride contains at least as many anhydride groups as N-(aminoalkyl)-substituted imide groups. Preferably, the molar ratio of diamine to anhydride groups is 0.05–0.5:1, most preferably 0.1–0.33:1.

An alternative form of polyanhydride according to the invention is the reaction product of a polymer of an olefinically unsaturated tricarboxylic acid such as aconitic acid or an anhydride thereof with an amino alcohol, preferably a tertiary amino alcohol such as N,N-dimethyl ethanolamine. The reaction is carried out under conditions such as to remove water, for example at reflux in an organic solvent of higher boiling point than water and/or azeotroping with water, for example using butyl acetate as solvent.

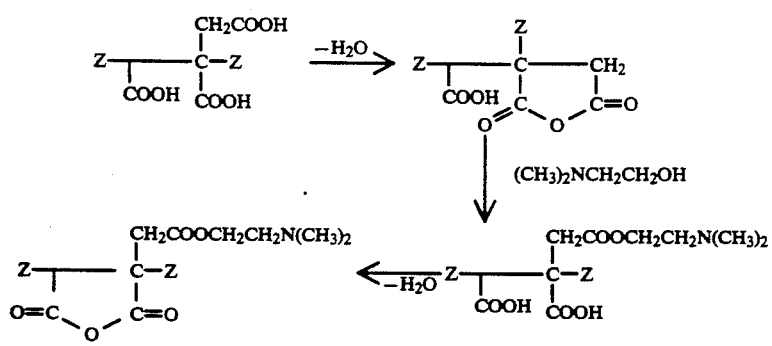

This product containing anhydride groups and pendent aminoalkyl ester groups may have increased reactivity with hydroxy groups.

A polymer containing cyclic carboxylic acid anhydride groups and pendent amine groups cannot in general be formed by the copolymerisation of an unsaturated cyclic carboxylic acid anhydride such as maleic anhydride or itaconic anhydride and an unsaturated amine such as a dialkylaminoalkyl acrylate or methacrylate. Such polymerisation forms either a polyacid or a black charge-transfer complex as described by Taylor and Woodward in J. Polymer Science, Part A., Vol. 1, pp 1473-1482 (1963). A polymer containing anhydride groups and pendent amine groups can however be formed by addition copolymerisation of an olefinically unsaturated dicarboxylic acid and an olefinically unsaturated amine, preferably a tertiary amine such as a dialkylaminoalkyl acrylate or methacrylate under conditions such as to remove water, for example at a temperature above 100° C. and/or by azeotropic distillation. The preferred olefinically unsaturated dicarboxylic acid is itaconic acid, which can be dissolved in a polar organic solvent such as tetrahydrofuran. The unsaturated dicarboxylic acid solution is preferably added to the polymerisation vessel separately from the amine monomer, which can for example be diethylaminoethyl or dimethylaminoethyl acrylate or methacrylate. The amine monomer can be dissolved in an organic solvent such as an aromatic hydrocarbon, ester or ketone, preferably together with one or more olefinically unsaturated comonomers. The solvent for the unsaturated dicarboxylic acid may be removed by distillation during the polymerisation; the copolymer is more soluble in organic solvents than the acid monomer.

A further alternative type of polyanhydride is a graft copolymer of a polymer containing cyclic carboxylic acid anhydride groups and a polymer containing amine groups. Such a graft copolymer can e formed if one of the polymers contains olefinic unsaturation (for example resulting from polymerisation of a diene) and grafting is carried out using a free radical catalyst such as a peroxide. The polymer containing unsaturation is conveniently a maleinised diene polymer, preferably maleinised polybutadiene, containing residual unsaturation.

The hydroxy-functional component (A) to be reacted with the amine-containing anhydride-functional component (B) is preferably a film-forming polymer and can be selected to give the desired properties in the cured coating. For example, it can be and addition copolymer having pendent hydroxy groups such as an acrylic copolymer containing 5-80% by weight, preferably 10-50% by weight, of a hydroxy-containing ester of an olefinically unsaturated carboxylic acid, for example, a hyroxyalkyl acrylate or methacrylate such as hydroxyethyl acrylate, hyroxyethyl methacrylate, hydroxypropyl methacrylate or hydroxypropyl acrylate. The hydroxy-containing ester can contain further ester linkages or ether linkages, for example 2-(beta-hyroxyethoxy)-ethyl acrylate or methacrylates or an adduct of hydroxyethyl acrylate or methacrylate with caprolactone. Examples of olefinically unsaturated monomers which can be polymerised with the hydroxy-containing ester are acrylic esters such as butyl acrylate, methyl methacrylate, butyl methacrylate, ethyl acrylate and hexyl acrylate and vinyl compounds such as styrene, vinyl acetate and vinyl chloride. The hydroxy component (A) can be a copolymer containing a polyester segment, for example a graft copolymer of acrylic monomers onto an unsaturated polyester. The acrylic monomers are preferably selected from those mentioned above and include a hydroxy-containing monomer such as a hydroxyalkyl acrylate or methacrylate. The polyester segment is preferably a low molecular weight (below 1000) polyester derived from a polyol such as ethylene glycol, propylene glycol or trimethylolpropane and an acid or anhydride such as phthalic anhydride, isophalic acid or adipic acid with a minor amount of an unsaturated acid or anhydride such as maleic anhydride. The polyester can for example form up to 50% by weight, preferably 5-25% by weight, of the graft copolymer. Coatings prepared using an acrylic hydroxy-functional component or an acrylic polyester graft copolymer hydroxy-functional component have excellent gloss, flow and appearance after spraying.

An alternative method of preparing an addition copolymer having pendent hydroxy groups for use as the hydroxy component (A) is to prepare a copolymer having amide groups, for example acrylamide or methacrylamide units, and to form N-methylol groups on the amide by reaction with formaldehyde.

The hydroxy-functional component (A) can alternatively be a telechelic polymer having hydroxy groups at each end of a polymer chain, such as a polyether, aliphatic polyester, silicone, diene polymer, hydrogenated diene polymer, polyurethane, polyisobutylene or polyacrylate. The use of such a telechelic polymer can give cured coatings having high impact- and abrasion-resistance. Such a telechelic polymer preferably contains more than two hydroxy groups per molecule, for example it can be a polyester or polyether having three or four arms each terminated by a hydroxy group. One example of such a hydroxy-terminated polyester sold commercially is a polycaprolactone tetraol of molecular weight about 1000. Alternative hydroxy-functional polyesters can be prepared from polyols such as ethylene glycol, propylene glycol, 1,3-propanediol, 1,2-butanediol, 1,4-butanediol, 1,6-hexanediol, 1,4-cyclohexane-dimethanol, diethylene glycol, dipropylene glycol or neopentyl glycol with dicarboxylic components such as phthalic anhydride, isophthalic acid, maleic anhydride and/or adipic, azelaic or sebacic acid and a trifunctional compound such as trimethylolpropane, trimethylolethane, glycerol or trimellitic anhydride, using an excess of the polyols to obtain a hydroxy-tipped polymer. A lactone such as caprolactone or a hydroxy-acid such as hydroxy-caproic acid or dimethylol-propionic acid can be included in the polyester-forming reaction. The hyroxy-functional polyester can be an alkyd polyol containing fatty acid moieties. Another suitable hydroxy-functional polyester can be prepared by reacting an epoxide such as ethylene oxide or a glycidyl ether or ester with a dicarboxylic acid. Various hydroxy-tipped polyethers are sold commercially, for example under the Trade Marks "Tetracol" and "Terathane", typically having molecular weights in the range 600–2400. These are generally formed by the reaction of a polyol such as glycerol, trimethylolpropane or a higher polyol with propylene oxide and/or ethylene oxide or with tetrahydrofuran. Hydroxy-tipped addition polymers, for example hydroxy-tipped polybutadienes or butadiene/styrene or butadiene/acrylonitrile polymers can also be used. Hydroxy-tipped polyurethanes can alternatively be used, formed for example from a polyisocyanate and an excess of a polyol component which may comprise a polyether or polyester polyol and a low molecular weight polyol.

Alternative hydroxy-functional polymers suitable for use as the hydroxy component (A) include amide-containing polyols prepared by the reaction of a polycarboxylic acid or anhydride with a polyol and a diamine or amino alcohol, epoxy polyols prepared by the reaction of glycidyl ethers of polyphenols such as the diglycidyl ether of bisphenol A with a bisphenol or an aliphatic diol, polyvinyl alcohol, an allyl alcohol polymer such as a styrene/allyl alcohol copolymer optionally containing alkyl ether units, cellulose or a cellulose derivative, or a hydroxy-functional polyurethane.

The hydroxy-functional component (A) can alternatively be a non-polymeric polyol or can include a non-polymeric polyol such as ethylene glycol, 1,4-butane diol, neopentyl glycol, 1,4-cyclohexane-dimethanol, 2,2-dimethyl-3-hydroxy propyl 2,3-dimethyl-3-hydroxypropionate, diethylene glycol or an alkoxylated bisphenol A.

The coating composition of the invention is generally a two-pack coating in which the hydroxy component (A) and the polyanhydride (B) are stored separately and are mixed shortly before use. The coating can be applied to a substrate by spray, for example conventional airless spray or twin feed spray in which the polymers (A) and (B) are not mixed until the spray head, or by roller or brush. The coating composition generally has a pot life of at least fifteen minutes when it is to be applied by twin feed spray or at least one hour after mixing when applied by other techniques. The coating is preferably an ambient temperature-curing coating capable of curing at ambient temperature, for example 10°–40° C., on the substrate to a hard film which is tack-free and resistant to solvent so that it can be overcoated within 24 hours. Maximum hardness, solvent-resistance and impact-resistance generally develop over a number of days at ambient temperature, for example 5–20 days. Curing can be carried out at temperatures above ambient, for example in the range 40°–180° C, particularly 100°–150° C., for shorter times if this is more convenient, for example when coating under factory conditions.

The proportion of anhydride groups in the anhydride component (B) to hydroxy groups in the hydroxy component (A) is preferably 0.5:1–2:1.

The anhydride component and the hydroxy component are each preferably dissolved in a solvent, such as a hydrocarbon and/or a polar organic solvent, for example, xylene or toluene or trimethylbenzene or mixtures thereof with an ester such as butyl acetate or ethoxyethyl acetate or methoxypropyl acetate or with a ketone such as methylisobutylketone or a methylisoamylketone. For most uses the polymers (A) and (B) are preferably compatible both in solution and in the absence of solvent so that a clear coating is obtained. For some uses in which toughness of the coating is more important than appearance the polymers may be less compatible so that there is some phase separation as the coating dries, leading to domains of a mixture rich in one polymer in a matrix rich in the other polymer. This can give increased impact-resistance, though with less complete cure because the anhydride and hydroxy components are not stoichiometrically balanced in each phase.

The coating composition usually contains additives such as pigments or filers, for example opaque or translucent pigments or metallic flake pigments, fillers, plasticisers, antioxidants, UV stabilisers, surfactants or flow control agents including additives for imparting thixotropy or sag resistance or pigment orientation. These additives can be included in either or both of the components of the paint, although it is preferred to include any pigments or fillers which may contain significant amount of absorbed water with the hydroxy component (A) to avoid reaction with the anhydride.

Industrial applicability

The coating composition of the invention can be applied to a wide variety of substrates, particularly to rigid substates such as metal, wood, glass or plastics. The compositions can be applied over most commercially sold primers. They can be applied by spray, which is generally preferred, brush or roller or by dipping or flow coating. The coating compositions of the invention are widely useful as top coat paints and are particularly useful as automotive paints and are particularly useful as automotive paints, including paints for vehicle re-finishing. They can be applied in "clear on base" coating systems in which a pigment coat is overcoated with a transparent clear coat. The coating composition of the invention can be used as either the base coat or the clear coat in such coating systems or preferably as both. They can also be applied as clear coats over known base coats such as polyurethane, acrylic or polyester base coats.

The coating compositions of the invention can alternatively be formed as powder coatings in some cases, provided that both the hydroxy component (A) and the anhydride component (B) are solids at temperatures of up to 50° C. and provided that at least one of (A) and (B) is a synthetic resin having a glass transition temperature in the range 0°–120° C., preferably 40°–90° C. For use in powder coating the anhydride component (B) preferably does not contain an olefinically unsaturated double bond in the alpha, beta- or beta, gamma-position with respect to any anhydride groups, and if the anhydride component (B) is an addition polymer the anhydride groups are preferably separated from the addition polymer chain by at least one intervening carbon atom. It can be derived from a polyanhydride of this type described in European Patent Application 209377, for example by reaction with a primary/tertiary diamine.

The polyanhydrides of the invention can be used as crosslinking agents for polymers containing hydroxy groups in uses other than coatings. For example, they can be used as crosslinking agents for cellulose. The cellulose can for example be in the form of pulp or in the form of fibres such as regenerated cellulose or cotton fibres. It can be reacted with the polyanhydride by heating a slurry of the cellulosic material in a solution of the polyanhydride in an organic solvent. Alternatively, wood or a wood product can be strengthened by impregnation with a solution of the polyanhydride, or a cellulosic textile material can be sized with a solution of the polyanhydride.

EXAMPLES

The invention is illustrated by the following Examples, in which parts and percentages are by weight. Examples 1–3, 7, 10, 12, 14 and 17 are examples of the preparation of amine-functional polyanhydrides according to the invention. Examples 4–6, 8, 9, 11, 13, 15, 16 and 18 are examples of coating compositions according to the invention.

EXAMPLE 1

1(a) Preparation of Itaconic Anhydride Copolymer

Butyl acetate solvent (142 g) was placed in a 5-liter vessel equipped with mechanical stirrer, addition funnel, reflux condenser and gas inlet. The addition funnel contained itaconic anhydride (150.0 g), methyl methacrylate (75.0 g) and styrene (275.0 g). 2,2'-azobismethylbutyronitrile (25.0 g) was added to the above mixture and the whole dissolved in butyl acetate (500 g). The solvent in the reaction vessel was heated to reflux under a nitrogen atmosphere and the contents of the funnel were added slowly with stirring over a period of 3 hours. After complete addition, stirring and heating were maintained for an additional 1.5 hours to complete polymerisation. The resulting polymer, POLYMER A, had a number average molecular weight Mn of 8000 relative to polystyrene, as determined by gel permeation chromatography, and an anhydride equivalent weight of 389.

1(b) Preparation of Amine-Functional Polyanhydride

Polymer A (92.0 g) was placed in 500 ml vessel equipped with mechanical stirrer, addition funnel, Dean and Stark trap and gas inlet, and the addition funnel was charged with N,N-dimethylpropane-1,3-diamine (12.1 g). The contents of the vessel were heated to reflux under a nitrogen atmosphere and the contents of the funnel were added dropwise with stirring over 2 hours, during which time water of reaction was azeotropically removed. Heating and stirring were maintained for a further 0.5 hour. In total, 2.1 g of water was collected. The resulting polymer, POLYMER B, had an Mn of 8500 by gel permeation chromatography, an amine equivalent weight of 856 and an anhydride equivalent weight of 851.

EXAMPLE 2

2(a) Preparation of Maleic Anhydride Copolymer

A maleic anhydride copolymer was prepared following the procedure of Example 1(a) sub stituting an equal weight of maleic anhydride for the itaconic anhydride. The resulting polymer, POLYMER D, had an Mn of 8200 by gel permeation chromatography and an anhydride equivalent weight of 368.

2(b) Preparation of Amine-Functional Polyanhydride

In an identical manner to that detailed in Example 1(b), Polymer D (75.0 g) in butyl acetate solvent (75.0 g) was reacted with N,N-dimethylaminopropylamine (10.2 g). The resulting polymer, POLYMER E, had an Mn of 8700 by gel permeation chromatography, an amine equivalent weight of 1010 and an anhydride equivalent weight of 979.

EXAMPLE 3

3(a) Preparation of Anhydride-Functional Polymer

Dipentaerythritol (1mole, 254 g), epsilon-caprolactone (6 moles, 684 g) and dibutyltin dilaurate (1.0 g) were heated together in xylene (1000 g) at reflux for 4 hours. Mercaptoacetic acid (6 moles, 552 g) was added, and reflux was continued with water trapping until 108 g water had been collected. Isopropenyl acetate (100 g) was added, and total reflux continued for 1 hour to scavenge any residual hydroxy groups.

Solvent and unreacted esters were removed under vacuum to leave 1380 g of a fairly mobile pale yellow oil. Maleic anhydride (588 g, 6 moles) and triethylamine catalyst (0.6 g) were added and the mixture was held at below 30° C. with stirring for 4 hours.

3(b) Preparation of Amine-Functional Polyanhydride

Xylene (1500 g) was added to the above reaction product, followed by 4-aminopyridine (2 moles, 188 g) over a 1 hour period. The mixture was raised to reflux and water (36 g) collected over 7 hours. Volatiles were removed under vacuum to reveal 2120 g of polyanhydride, POLYMER F, as a yellow oil, with an anhydride equivalent weight of 530.

EXAMPLES 4–6

Pentaerythritol (79.9 g) suspended in xylene solvent (1400 g) containing dibutyltin dilaurate (0.75 g) was placed in a 5-liter vessel equipped with mechanical stirrer, reflux condenser, addition funnel and gas inlet, and the addition funnel was charged with dry epsilon-caprolactone (665.7 g). The vessel contents were stirred at reflux under a nitrogen atmosphere and the contents of the addition funnel were added to them slowly over 1 hour. Heating and stirring were maintained for a further 2 hours and the solvent was removed under vacuum. The resulting polymeric tetraol, POLYMER C, had an Mn of 1272 and a hydroxy equivalent weight of 318.

EXAMPLE 4

Polymer B (Example 1) (2.67 parts) in butyl acetate solvent (4.01 parts) was mixed with Polymer C (1.00 part) in butyl acetate (1.00 part) and cast on glass. It was cured at ambient temperature to give a hard, tough, glossy film within 16 hours. After 7 days at room temperature the film had good resistance to methylethylketone (MEK).

EXAMPLE 5

A mixture of Polymer E (Example 2) (3.08 parts) in butyl acetate solvent (4.62 parts) and polymer C (1.00 part) in butyl acetate solvent (1.00 part) was cast on glass and cured at ambient temperature. After 7 days at room temperature the film had good MEK resistance.

EXAMPLE 6

Polymer F (Example 3) (5.30 parts) was mixed with Polymer C (3.18 parts) in butyl acetate solution and cast on glass. The coating cured at ambient temperature to a hard but highly flexible coating.

COMPARATIVE EXAMPLE

A copolymer of itaconic anhydride was prepared in the same was as Example 1(a) but with a monomer composition itaconic anhydride 13%, methyl methacrylate 20% and styrene 67%. The polymer obtained had approximately the same anhydride equivalent weight as Polymer B.

It was admixed with hydroxy-functional Polymer C and coated on a glass panel as in Example 4. After 7 days at room temperature the coating was soft and dissolved by brief contact with solvents such as xylene or MEK.

EXAMPLE 7

Preparation of anhydride polymer

Itaconic anhydride (300 g), styrene (570 g), methyl methacrylate (130 g), "Vazo 67" (Trade Mark) free radical initiator (50 g) and a solvent mixture of xylene (300 g) and N-methyl pyrrolidone (100 g) were premixed and run into a refluxing mixture of xylene (450 g) and N-methyl pyrrolidone (150 g) over four hours. The mixture was held at reflux for a further one hour and cooled to provide a polyanhydride solution having a solids content of 46.6%, an Mn of 3800 and a weight average molecular weight (Mw) of 7700 (relative to polystyrene).

Preparation of amine-functional polyanhydride

N,N-dimethyl propane-1,3-diamine (9.2 g, equivalent to a third of the available anhydride groups) was added dropwise over 15 minutes to the refluxing anhydride polymer solution (215 g) in a vessel fitted with a water separator. Reflux distillation was continued for a further seven hours, when 1.7 g of water had been collected. The product had a solids content of 50.0% and an anhydride equivalent weight of 1204.

EXAMPLE 8

Preparation of acrylic polyol

Hydroxyethyl acrylate (193.5 g), methyl methacrylate (403.5 g), styrene (403.5 g) and "Vazo 67" initiator (40 g) were premixed and added dropwise to refluxing butyl acetate (1000 g) over 3 hours. Reflux was continued for one hour to yield a polymer solution having a solids content of 50%, and Mn of 5200, an Mw of 10,300 (relative to polystyrene) and a hydroxy equivalent weight of 600.

Coating composition 24.1 g of the amine-functional polyanhydride solution of Example 7 and 12.0 g of the acrylic polyol solution prepared above were mixed and cast as a film on glass at a dry film thickness of 60 microns. The coating was cured by heating at 150° C. for 3 minutes. The solvent-resistance of the cured coating was tested by rubbing with a cloth soaked in MEK; the coating was substantially unaffected by 200 MEK double rubs.

EXAMPLE 9

Preparation of polyester polyol

Trimethylolpropane (1 mole, 134 g), caprolactone (6 moles, 684 g) and xylene (407 g) were heated at reflux in the presence of tetrabutyltitanate (0.4 g) for four hours. The xylene was then removed by vacuum distillation to provide a polymer having a solids content of 97%, an Mn of 814 and a hydroxy equivalent weight of 271.

Coating composition 24.1 g of the amine-functional polyanhydride solution of Example 7 and 2.8 g of the polyester polyol prepared above were mixed, cast as a film and heat-cured as described in Example 8. The solvent-resistance of the cured coating was 150 MEK double rubs.

EXAMPLE 10

Preparation of polymeric anhydride

Aconitic acid (223 g), styrene (800 g) and "Vazo 67" (50 g) were dissolved in tetrahydrofuran (780 g) and added dropwise to refluxing butyl acetate over three hours. Azeotropic reflux was continued for a further eight hours, removing tetrahydrofuran and water through a packed column, whilst replenishing butyl acetate as necessary to avoid development of high viscosity.

The product was a polymer having a solids content of 50%, an Mn of 3400 and an Mw of 8500 (relative to polystyrene). It showed strong anhydride peaks in its infrared spectrum and its acid value after precipitation and methanolysis was determined as 43.6, indicating substantial incorporation of aconitic residues.

Its calculated anhydride equivalent weight was 780.

Preparation of amine-functional polyanhydride

Dimethylethanolamine (11.4 g) was added dropwise to the refluxing polymeric anhydride solution prepared above (200 g) over 15 minutes. Azeotropic reflux was continued until 2.3 ml of water had been removed and no hydroxy signal was visible in the infrared spectrum (8 hours). The resulting polymer had a solids content of 73%. Its amine equivalent weight after precipitation was determined as 783, and its anhydride equivalent weight was 851.

EXAMPLE 11

11.7 g of the amine-functional polyanhydride solution of Example 10 and 2.8 g of the polyester polyol of Example 9 were mixed and cast as a film on glass at a dry film thickness of 60 microns. The coating film was allowed to cure at ambient temperature (about 20° C.). The solvent-resistance of the coating was tested after 7 days and was found to be 95 MEK double rubs.

EXAMPLE 12

Preparation of amine-functional polyanhydride

Diethylaminoethyl methacrylate (100 g), styrene (630 g), neopentylglycol dimethyacrylate (70 g), and "Vazo 67" (50 g) were dissolved in xylene (400 g) and used as feed 1.

Itaconic acid (232 g) was dissolved in tetrahydrofuran (1000 g) as feed 2.

Feeds 1 and 2 were separately added dropwise to refluxing xylene (466 g) and N-methylpyrrolidone (200 g) over three hours whilst simultaneously removing tetrahydrofuran by distillation through a packed column. Azeotropic distillation was continued for a further eight hours, replenishing the solvent mixture with butyl acetate as necessary, until the infrared spectrum showed strong anhydride bands and very weak signals due to free carboxylic acid.

The resulting polymer solution was adjusted to 50% solids content. The polymer had an amine equivalent weight of 1850 and an anhydride equivalent weight of 560.

EXAMPLE 13

11.2 g of the amine-functional polyanhydride solution of Example 12 and 2.8 g of the polyester polyol of Example 9 were mixed, cast as a film and allowed to cure at ambient temperature as described in Example 11. The solvent-resistance of the coating after 7 days was 100 MEK double rubs.

EXAMPLE 14

Preparation of polymeric anhydride

A proprietary maleinised, anhydride-functional polybutadiene of calculated anhydride equivalent weight 490 (available from Revertex as "Lithene PM25MA") (200 g), xylene (400 g) and palladium metal (0.4 g) were treated with hydrogen at a pressure of 80 atmospheres and a temperature of 100° C. for 12 hours in a rocking autoclave. The vessel was cooled, vented and discharged to provide a solution, after recovery of the palladium by filtration, having a solids content of 33%, an anhydride equivalent weight of 490 and substantially no unsaturation.

Preparation of amine-functional polyanhydride

N,N-dimethylpropane-1,3-diamine (1.37 g, equivalent to 10% of the available anhydride) was added dropwise over 15 minutes to the hydrogenated polyanhydride solution prepared above (200 g). The mixture was azeotroped for eight hours and a proportion of the solvent removed by vacuum distillation to provide a polymer having a solids content of 50%, an amine equivalent weight of 5000 and an anhydride equivalent weight of 555.

EXAMPLE 15

Preparation of acrylic polyol

Hydroxyethyl methacrylate (130.0 g), methyl methacrylate (435 g), styrene (435 g) and "Vazo 67" (50 g) were premixed and added dropwise to refluxing butyl acetate (1000 g) over three hours. Reflux was continued for one hour to yield a polymer solution having a solids content of 54%, an Mn of 4800, an Mw of 9000 (relative to polystyrene) and a hydroxy equivalent weight of 1000.

11.1 g of the amine-functional polyanhydride solution of Example 14 and 18.5 g of the acrylic polyol solution prepared above were mixed, cast as a film and heat-cured as described in Example 8. The solvent-resistance of the cured coating was greater than 200 MEK double rubs.

EXAMPLE 16

11.1 g of the amine-functional polyanhydride solution of Example 14 and 12.0 g of the acrylic polyol solution of Example 8 were mixed, cast as a film and heat-cured as described in Example 8. The solvent-resistance of the cured coating was greater than 200 MEK double rubs.

EXAMPLE 17

Preparation of amine-functional polyanhydride

Ethyl acrylate (47.1 g), diethylaminoethyl methacrylate (52.9 g) and "Vazo 67" (5.0 g) were mixed and fed into refluxing butyl acetate (100 g) over three hours. The resulting polymer had an amine equivalent weight of 349. Lithene PM25MA (125.9 g) was then added, and benzoyl peroxide (11.3 g) added portionwise over 4 hours. The mixture was held at reflux for a further 4 hours to form a graft copolymer, cooled and discharged. It has a solids content of 70%, an amine equivalent weight of 789 and an anhydride equivalent weight of 879. Whilst grafting was probably not complete, it was sufficient to ensure compatibility.

EXAMPLE 18

The grafted polymer of Example 17 (12.6 g) was mixed with the acrylic polyol solution of Example 15 (18.5 g) and cast onto steel panels. Heat-curing (20 mins at 150° C.) produced a hard film, resistant to 70 MEK double rubs. Such a coating can be used as a stoving primer.

We claim:

1. A coating composition comprising (A) a hydroxy component having at least two free hydroxy groups per molecule and (B) an anhydride component having at least two cyclic carboxylic acid anhydride groups per molecule, at least one of (A) and (B) being a film-forming polymer, wherein the anhydride component (B) contains pendent amine groups for catalytically accelerating the curing reaction between the hydroxy groups of (A) and the anhydride groups of (B), and wherein the proportion of amine groups to cyclic carboxylic acid anhydride groups in the anhydride component (B) is no more than 1:1 and the content of free carboxylic acid groups in the anhydride component (B), if any are present, is less than 200 mole percent based on the amine groups.

2. A coating composition according to claim 1, wherein the hydroxy component (A) is an addition copolymer having pendent hydroxy groups.

3. A coating composition according to claim 1, wherein the hydroxy component (A) is a telechelic polymer having hydroxy groups at each end of a polymer chain.

4. A coating composition comprising (A) a hydroxy component having at least two free hydroxy groups per molecule and (B) an anhydride component having at least two cyclic carboxylic acid anhydride groups per molecule, at least one of (A) and (B) being a film-forming polymer, wherein the anhydride component (B) contains pendent amine groups for catalytically accelerating the curing reaction between the hydroxy groups of (A) and the anhydride groups of (B) and wherein the anhydride component (B) has an anhydride equivalent weight of no more than 1204, the proportion of amine groups to cyclic carboxylic acid anhydride groups in the anhydride component (B) is no more than 4:1 and the content of free carboxylic acid groups in the anhydride component (B), if any are present, is less than 200 mole percent based on the amine groups.

5. A coating composition according to claim 4, wherein the hydroxy component (A) is an addition copolymer having pendent hydroxy groups.

6. A coating composition according to claim 4, wherein the hydroxy component (A) is a telechelic polymer having hydroxy groups at each end of a polymer chain.

7. A coating composition according to claim 1, wherein the amine groups are tertiary amine groups.

8. A coating composition according to claim 1, wherein the anhydride component (B) is a polymer containing cyclic carboxylic acid anhydride groups and N-(dialkylaminoalkyl)-substituted imide groups.

9. A coating composition according to claim 4, wherein the amine groups are tertiary amine groups.

10. A coating composition according to claim 4, wherein the proportion of amine groups to cyclic carboxylic acid anhydride groups is 0.1:1 to 1:1.

11. A coating composition according to claim 4, wherein the anhydride component (B) is a polymer containing cyclic carboxylic acid anhydride groups and N-(dialkylaminoalkyl)-substituted imide groups.

12. A coating composition according to claim 11, wherein the anhydride component (B) is formed by the reaction of a polymer containing cyclic carboxylic acid anhydride groups with a less than stoichiometric amount of a polyamine containing a primary amine group and at least one tertiary amine group.

13. A coating composition according to claim 12, wherein said polymer containing cyclic carboxylic acid anhydride groups is derived from an olefinically unsaturated cyclic carboxylic acid anhydride.

14. A coating composition according to claim 13, wherein said polymer containing cyclic carboxylic acid anhydride groups is a copolymer of an olefinically unsaturated cyclic carboxylic acid anhydride with one or more olefinically unsaturated comonomers.

15. A coating composition according to claim 13, wherein said polymer containing cyclic carboxylic acid anhydride groups is an adduct of an unsaturated cyclic carboxylic acid anhydride and a diene polymer.

16. A coating composition according to claim 11, wherein the anhydride component (B) is the reaction product of a polymer of an olefinically unsaturated tricarboxylic acid or an anhydride thereof with an amino alcohol.

17. A coating composition according to claim 4, wherein the anhydride component (B) is an additional polymer containing cyclic carboxylic acid anhydride groups and dialkylaminoalkyl groups.

18. A coating composition according to claim 4, wherein the anhydride component (B) is a graft copolymer of a polymer containing cyclic carboxylic acid anhydride groups and a polymer containing amine groups.

* * * * *

UNITED STATES PATENT AND TRADEMARK OFFICE
CERTIFICATE OF CORRECTION

PATENT NO. : 5,218,055
DATED     : June 8, 1993
INVENTOR(S): Alastair R. Marrion and Alastair A. Finnie It is certified that error appears in the above-identified patent and that said Letters Patent is hereby corrected as shown below:

Column 5, line 52, change "e" to read --be--.

Column 5, line 64, "and" should read --an--.

Column 7, line 48, "2,3" should read --2,2--.

Column 8, line 43, "substates" should read --substrates--.

Column 8, lines 49-50, delete "and are particularly useful as automotive paints".

Column 11, line 16, change "was" to read --way--.

Column 14, line 15, change "has" to read --had--.

Signed and Sealed this

Thirtieth Day of August, 1994

Attest:

BRUCE LEHMAN

Attesting Officer    Commissioner of Patents and Trademarks